June 17, 1930.  A. C. ROWLEY  1,765,243
FUSIBLE LINK
Filed June 21, 1928
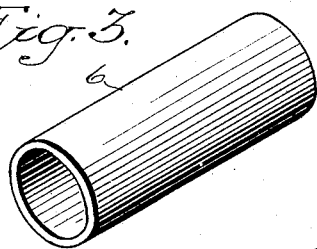
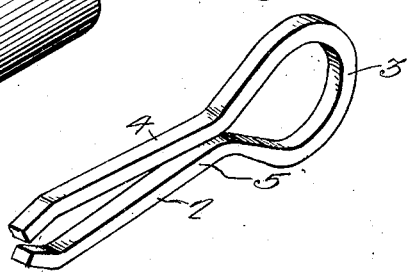
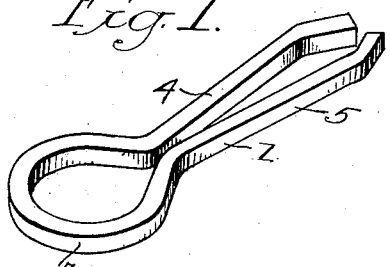
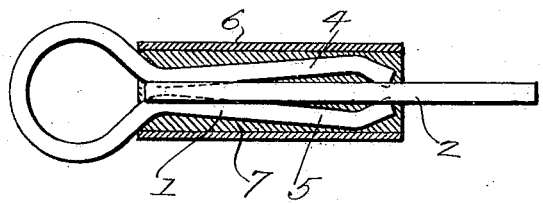
Inventor:-
Arthur C. Rowley
by his Attorneys,
Howson & Howson.

Patented June 17, 1930

1,765,243

UNITED STATES PATENT OFFICE

ARTHUR C. ROWLEY, OF PHILADELPHIA, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA

FUSIBLE LINK

Application filed June 21, 1928. Serial No. 287,276.

The principal object of this invention is to provide a fusible link which shall be generally more efficient and desirable than those made in accordance with the prior practice.

More specifically, an object of the invention is to provide a link which shall be considerably more critical in its reaction to temperature than heretofore has been found practicable.

The invention further contemplates the provision of a link of extremely simple form having material advantages of manufacture over links of prior form.

A still further object of the invention is to devise a link comprising a mechanical interlock of separable parts in which an exceptionally small proportion of the force tending to separate the said parts comes upon the fusible composition.

The foregoing and other desirable ends I accomplish by means of the construction illustrated in the attached drawings, in which:

Figures 1 and 2 are views in perspective of the interlocking members forming a part of my device;

Fig. 3 is a view in perspective of the housing for said interlocking members, which housing also functions to retain the fusible medium; and Fig. 4 is a longitudinal sectional view through the assembled link.

Referring to the drawings, my device in a preferred form comprises a pair of members 1 and 2 which may be identical in form and which are adapted to interlock yieldingly to form a mechanical union which under conditions hereinafter set forth can be broken to permit longitudinal separation. As shown in Figs. 1 and 2 the interlocked separable elements are formed with an eyelet 3 at one end from which extend equal resilient arms 4 and 5, these arms where they join the eyelet being close together and diverging slightly to a point adjacent their extremities from which point they converge so that their extremities touch or lie closely adjacent. These elements are adapted to be telescoped, as shown in Fig. 4, in which condition the inturned ends of each element close behind the restriction at the base of the arms of the other element to form a mechanical interlock which can be broken only by the spreading or springing apart of the arms of the respective elements. With the aforedescribed construction, application of a sufficient tensional force tending to draw the elements apart longitudinally will result in the transverse separation of the ends of the arms 4 and 5, thereby destroying the interlock and permitting the elements to separate. These elements may suitably be formed of resilient wire, and it will be apparent that the resistance of the arms to separation under a tensional force tending to draw the elements apart longitudinally may be governed by the material of which the elements are made and by the angle at which the extremities of the arms 4 and 5 converge. The elements may be so made that a comparatively light resistance to transverse spreading of the arms will counteract a comparatively heavy force tending to draw the elements apart longitudinally. Preferably, the wire or other resilient material of which the members 1 and 2 are formed is of rectangular cross section, although this is not essential.

In conjunction with the elements 1 and 2, I provide a housing in the form of a sleeve 6, shown in Fig. 3, which in assembly and as shown in Fig. 4 surrounds the interlocked portions of the said elements. The inner diameter of the sleeve is sufficiently greater than the width of the elements 1 and 2 to permit separation of the arms 4 and 5 to an extent releasing the elements from each other. In assembly, the housing 6 is filled with the fusible compound 7 which entirely surrounds the interlocked parts of the elements 1 and 2 as illustrated and which functions to resist the transverse spreading apart of the arms 4 and 5 of the elements 1 and 2, which action is necessary as set forth above before the links can separate longitudinally. The fusible compound is backed and protected by the housing 6, and it will be apparent that the compressive strength of the compound may be relatively low in a link capable of supporting substantial weights without separation except as the fusible compound is affected by excessive temperatures. The mechanical interlock between the links is a thoroughly strong one and the transverse component of the force which tends to pull the elements of the link apart longitudinally is so relatively small that the link is capable of supporting relatively great weights. With a rectangular cross section as set forth above, a flat and relatively wide surface is presented to the fusible material which affords an effective bearing and largely avoids any tendency for the arms to wedge their way through the material. Obviously, a flat bearing surface may be obtained by other than a rectangular cross section.

While many forms of fusible compounds may be used in my device, it is particularly well suited to alphamononitro-naphthalene. This material, while having a relatively low melting point, maintains its integrity with practically no change until the melting point is reached, and is, therefore, well adapted to prevent the transverse spreading of the arms of the elements 1 and 2 until the melting point has been approximately reached. There is no tendency for this material to "creep" or lose its hardness until the melting point has been approximately reached, as in the metallic fusible alloys heretofore generally used in devices of this character.

In assembly the link, the elements 1 and 2 are inserted in opposite ends of the housing 6 and are telescoped as illustrated in Fig. 4. The telescoping operation is assisted by the V-shaped formation of the ends of the elements 1 and 2 where the extremities of the arms come together, which causes the arms 4 and 5 to separate with slight resistance when the parts are pushed toward and against each other. Thereafter the fusible compound in liquid state is poured into the housing until the latter is filled, and is solidified by cooling. Other types of fusible compound may be pressed into the housing in solid condition.

My device is capable of use for any purpose where fusible links have heretofore been employed, such for example as in fire doors, skylight controls, quick-opening or -closing valves and control of ventilating fans, &c. It is particularly desirable by reason of its high efficiency and relatively low temperature factor. The device also is simple in form and extremely easy to manufacture.

I claim:

1. In a fusible link, a pair of elements comprising means for yieldingly interlocking one with the other, a housing for said elements, and a fusible material within the housing for normally preventing the yielding of said elements and to thereby maintain said interlock.

2. A fusible link comprising interlocking elements having parts yieldable transversely under a predetermined strain upon said elements to break said interlock, a housing for said elements, and heat responsive means in said housing normally preventing said transverse yielding.

3. A fusible link comprising longitudinally separable and normally transversely interlocked elements, a sleeve surrounding said elements, and a fusible compound within the sleeve tending to maintain said transverse interlock.

ARTHUR C. ROWLEY.